(12) United States Patent
Langoju et al.

(10) Patent No.: US 12,530,745 B2
(45) Date of Patent: Jan. 20, 2026

(54) SYSTEMS AND METHODS TO REDUCE UNSTRUCTURED AND STRUCTURED NOISE IN IMAGE DATA

(71) Applicant: GE Precision Healthcare LLC, Milwaukee, WI (US)

(72) Inventors: Rajesh Langoju, Karnataka (IN); Utkarsh Agrawal, Karnataka (IN); Bhushan Patil, Karnataka (IN); Vanika Singhal, Karnataka (IN); Bipul Das, Karnataka (IN); Jiang Hsieh, Brookfield, WI (US)

(73) Assignee: GE PRECISION HEALTHCARE LLC, Milwaukee, WI (US)

( * ) Notice: Subject to any disclaimer, the term of this patent is extended or adjusted under 35 U.S.C. 154(b) by 664 days.

(21) Appl. No.: 17/385,600

(22) Filed: Jul. 26, 2021

(65) Prior Publication Data

US 2023/0029188 A1    Jan. 26, 2023

(51) Int. Cl.
*G06T 5/70*    (2024.01)
*G06F 18/214*    (2023.01)
(Continued)

(52) U.S. Cl.
CPC ............. *G06T 5/70* (2024.01); *G06F 18/214* (2023.01); *G06N 3/084* (2013.01); *G06T 7/0012* (2013.01);
(Continued)

(58) Field of Classification Search
CPC . G06T 2207/20081; G06T 2207/20084; G06T 5/70; G06T 2207/30004;
(Continued)

(56) References Cited

U.S. PATENT DOCUMENTS 10,565,686 B2    2/2020    Lehtinen et al.
11,222,406 B2 *  1/2022    Sharma ..................... G06T 5/60
(Continued)

FOREIGN PATENT DOCUMENTS

CN    111081354 A        4/2020
CN    111626964 A  *   9/2020    ........... A61B 6/5235

OTHER PUBLICATIONS

Lehtinen, Jaakko, et al. "Noise2Noise: Learning image restoration without clean data." arXiv preprint arXiv:1803.04189 (2018). (Year: 2018).*

(Continued)

*Primary Examiner* — Sumati Lefkowitz
*Assistant Examiner* — Aaron Joseph Sorrin
(74) *Attorney, Agent, or Firm* — McCoy Russell LLP

(57) ABSTRACT

A multi-stage deep learning method is provided, comprising training a deep learning network using a set of training pairs interchangeably including input data from a first noisy dataset with a first noise level and target data from a second noisy dataset with a second noise level, and input data from the second noisy dataset and target data from the first noisy dataset; generating an ultra-low noise data equivalent based on a low noise data fed into the trained deep learning network; and retraining the deep learning network on the set of training pairs using the target data of the set of training pairs in a first retraining step, and using the ultra-low noise data equivalent as target data in a second retraining step.

20 Claims, 9 Drawing Sheets

(51) Int. Cl.
    *G06N 3/084* (2023.01)
    *G06T 7/00* (2017.01)

(52) U.S. Cl.
    CPC .............. *G06T 2207/10081* (2013.01); *G06T 2207/10088* (2013.01); *G06T 2207/10104* (2013.01); *G06T 2207/10116* (2013.01)

(58) Field of Classification Search
    CPC .......... G06T 2207/20182; G06T 5/002; G06T 7/0012; G06T 2207/10081; G06T 2207/10088; G06T 2207/10104; G06T 2207/10116; G06N 3/08; G06N 3/088; G06N 20/00; G06N 3/02; G06N 3/084; G06N 3/0464; G06N 3/09; A61B 6/5205; A61B 6/5258; A61B 5/7203; A61B 6/5211; G16H 30/20; G16H 30/40; G16H 50/20; G01R 33/56; G06V 10/30; G06V 2201/03; G06V 10/774; G06V 10/82; G01N 2223/401; G06F 18/214
    See application file for complete search history.

(56) References Cited

U.S. PATENT DOCUMENTS

| | | | |
|---|---|---|---|
| 11,517,197 B2* | 12/2022 | Zhou | G06T 11/005 |
| 2018/0075581 A1* | 3/2018 | Shi | G06N 3/045 |
| 2018/0204314 A1 | 7/2018 | Kaplanyan et al. | |
| 2018/0293713 A1* | 10/2018 | Vogels | G06F 18/2148 |
| 2019/0365341 A1* | 12/2019 | Chan | G06T 7/0012 |
| 2020/0294201 A1 | 9/2020 | Planche et al. | |
| 2020/0311878 A1* | 10/2020 | Matsuura | G06F 18/2115 |
| 2020/0357097 A1 | 11/2020 | Peeman et al. | |
| 2021/0007695 A1* | 1/2021 | Lu | G06T 11/003 |

OTHER PUBLICATIONS

English translation: CN-111626964-A (Year: 2020).*
International Application No. PCT/US2022/038216 filed Jul. 25, 2022—International Search Report and Written Opinion issued on Dec. 6, 2022; 13 pages.

* cited by examiner

SYSTEMS AND METHODS TO REDUCE UNSTRUCTURED AND STRUCTURED NOISE IN IMAGE DATA

TECHNICAL FIELD

Embodiments of the subject matter disclosed herein relate to medical imaging, and more particularly, to systems and methods for removing noise from medical images.

BACKGROUND

Medical images may include an amount of noise, which may reduce a quality of the medical images and hinder diagnosis. The amount of noise in medical image data may be related to a duration of a scan. For example, a first CT scan of a patient taken at lower kilovoltage peak (kVp) or lower milliampere-seconds (mAs) may have a relatively higher amount of noise, while a second CT scan of a patient with higher kVp and mAs may have relatively lower amount of noise. As a result, a quality of the second CT scan may be higher than a quality of the first CT scan, where target features of the patient may be displayed more clearly in the second CT scan than the first CT scan and/or with a lesser number of artifacts.

The first CT scan may be referred to as a low-dose CT scan, where a patient is exposed to a first, low amount of radiation, and the second CT may be referred to as a high-dose CT scan, where the patient is exposed to a second, higher amount of radiation (e.g., five times more radiation than the low-dose radiation). Low-dose CT scan may sometimes be preferable to the second, high-dose CT scan due to the lower amount of radiation to which the patient is exposed.

SUMMARY

The current disclosure includes a multi-stage deep learning method, comprising training a deep learning network using a first set of training pairs, where a first portion of the first set of training pairs includes input data from a first noisy dataset with a first noise level and target data from a second noisy dataset with a second noise level, and a second portion of the first set of training pairs includes input data from the second noisy dataset with the second noise level and target data from the first noisy dataset with the first noise level; generating an ultra-low noise data equivalent based on a low noise data fed into the trained deep learning network, the low noise data having a noise level lower than the noise levels of the first noisy dataset and the second noisy dataset, the ultra-low noise data equivalent having a noise level lower than the low noise data; and retraining the deep learning network on a second set of training pairs generated in a same manner as the first set of training pairs using the target data of the second set of training pairs in a first retraining step, and using the ultra-low noise data equivalent as target data in a second retraining step. By training the deep learning network in a first stage with the first noisy dataset and the second noisy dataset used interchangeably as inputs and targets, unstructured noise in the data may be identified and reduced. By retraining the deep learning network in a second stage using the ultra-low noise data equivalent as additional target data, structured noise in the data may be identified and reduced. In this way, a quality of low-dose medical images may be improved by reducing the relatively high amount of both structured and unstructured noise of the low-dose medical images. By denoising the low-dose medical images, high dose equivalent low-noise images may be generated without exposing the patient to a higher amount of radiation of a high-dose CT scan, thereby reducing a risk to the patient and improving patient outcomes overall.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

Figure 1:
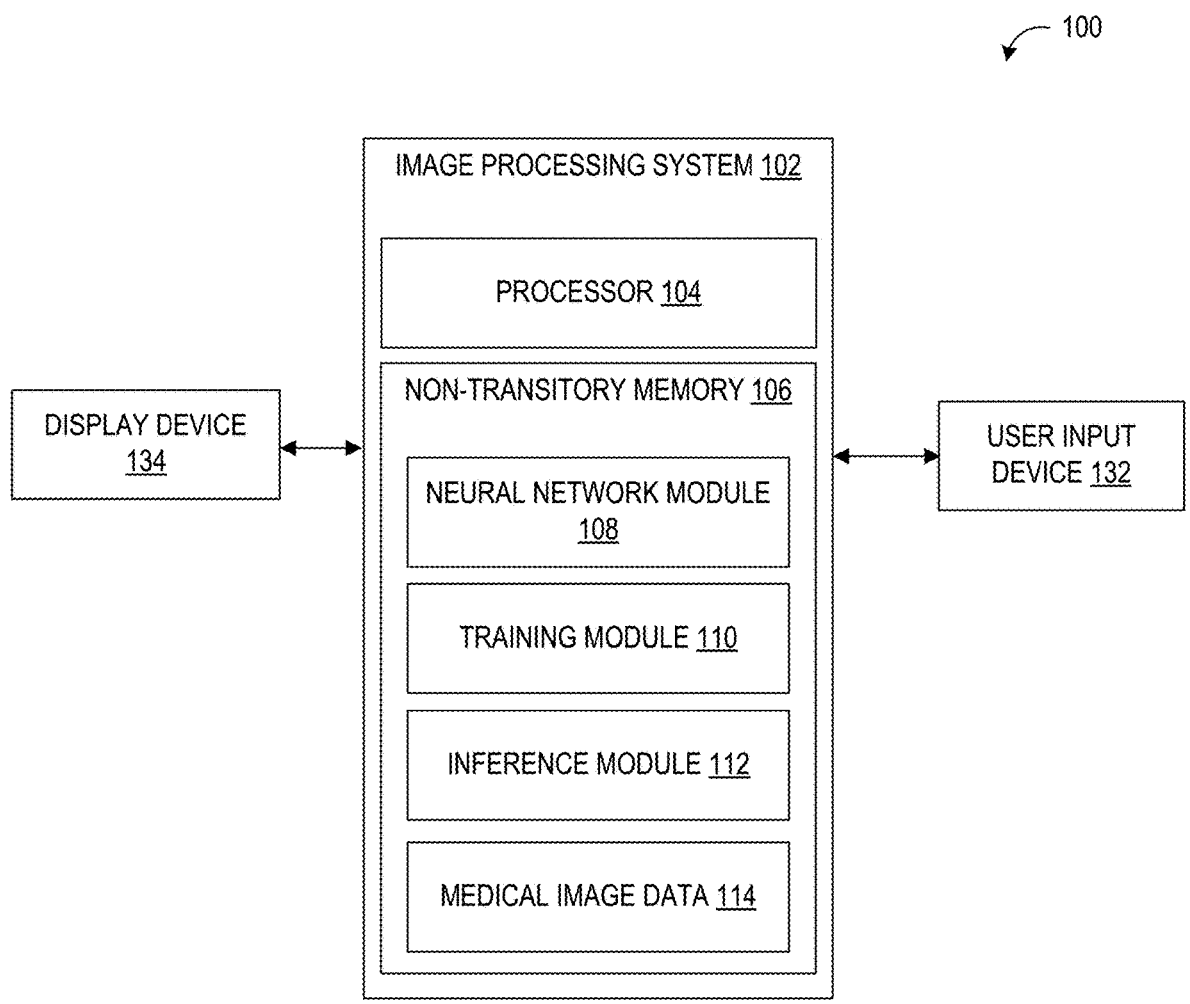
FIG. 1 shows a block diagram of an exemplary embodiment of an image processing system configured to reduce, and in some examples, remove, noise from medical images.

The drawings illustrate specific aspects of the described systems and methods for mapping one or more medical images in a first resolution to one or more corresponding medical images in a target resolution using generative neural networks. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

Methods and systems are provided herein for removing noise from (e.g., denoising) image data such as medical image data. While the medical image data described herein is computerized tomography (CT) image data, it should be appreciated that the medical image data may include, for example, X-ray image data, ultrasound image data, magnetic resonance imaging (MRI) image data, positron-emission tomography (PET) data, and/or image data of a different imaging modality, including one dimensional (1D), two dimensional (2D), and three dimensional (3D) data, without departing from the scope of this disclosure.

In an embodiment, both structured and unstructured noise may be reduced or removed from a medical image by an image processing system, such as the image processing system 102 of FIG. 1. As explained herein, one issue with reducing an amount of noise in a medical image is that different types of noise may be present in image data. For example, the noise in the image data may include structured noise and/or unstructured noise, where structured noise is noise that is correlated with features present in the image, and unstructured noise is noise that is uncorrelated with features present in the image. The structured noise may include artifacts like streaks, which may be visible in a target feature of the image across a plurality of images. The unstructured noise may be random noise that is not based on aspects of the target feature, which does not persist across the plurality of images. As a result, approaches to denoising data may not be equally successful with structured noise and unstructured noise, where an algorithm or model constructed to reduce unstructured noise may be less successful at reducing structured noise. While there is a large body of work in removal of unstructured noise from images, it is extremely difficult to remove structured noise, because of its high correlation with image features. Therefore, the image processing system may include a noise reduction neural network model stored in non-transitory memory. The noise reduction neural network model may be trained and deployed to output an image with less noise from an input comprising a noisy medical image. The noise reduction neural network model may be trained in accordance with a multi-stage, deep learning training method.

Figure 2A:
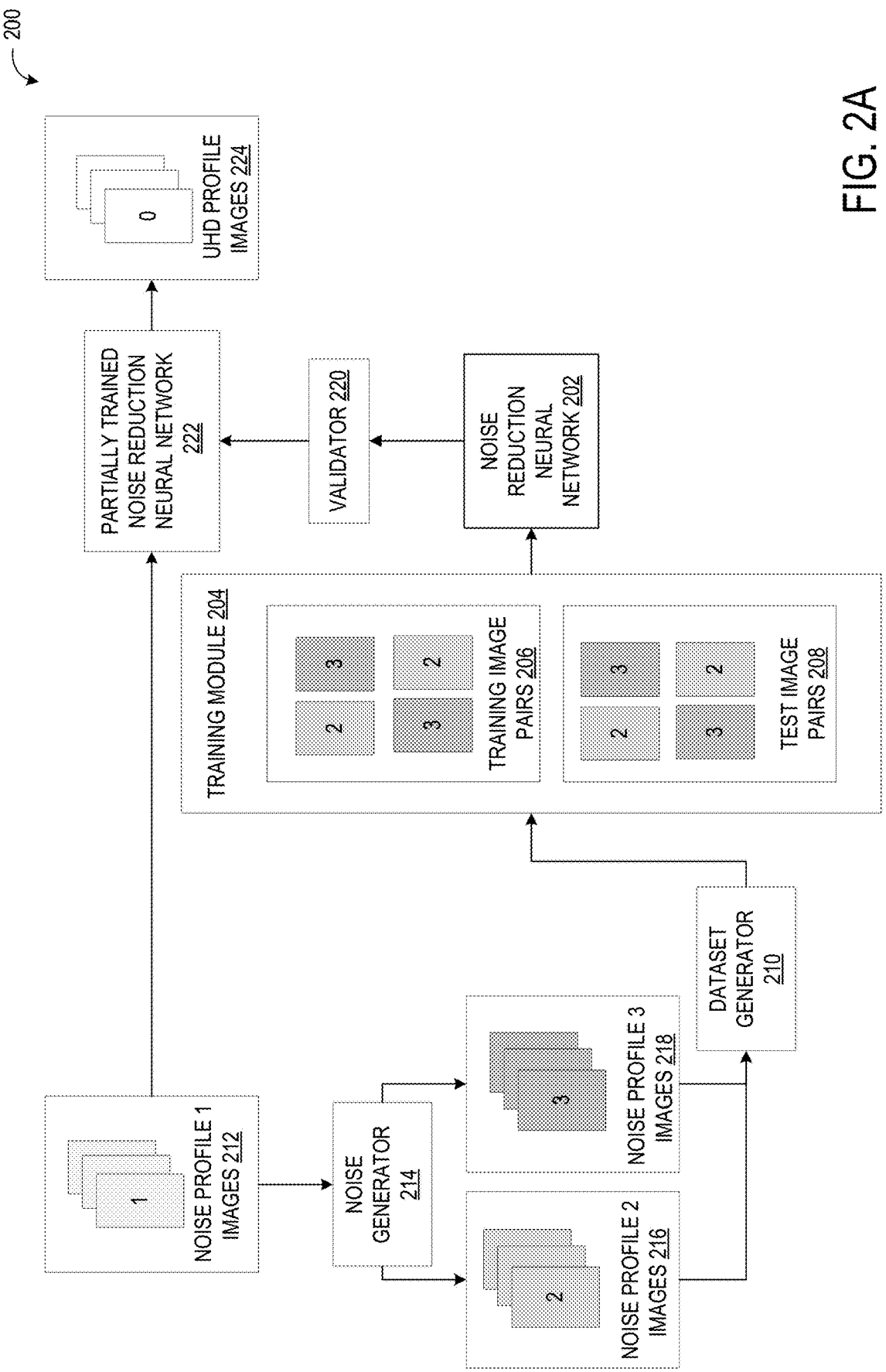
FIG. 2A shows a block diagram of an exemplary embodiment of a noise reduction neural network training system for training a neural network in a first stage.
Figure 2B:
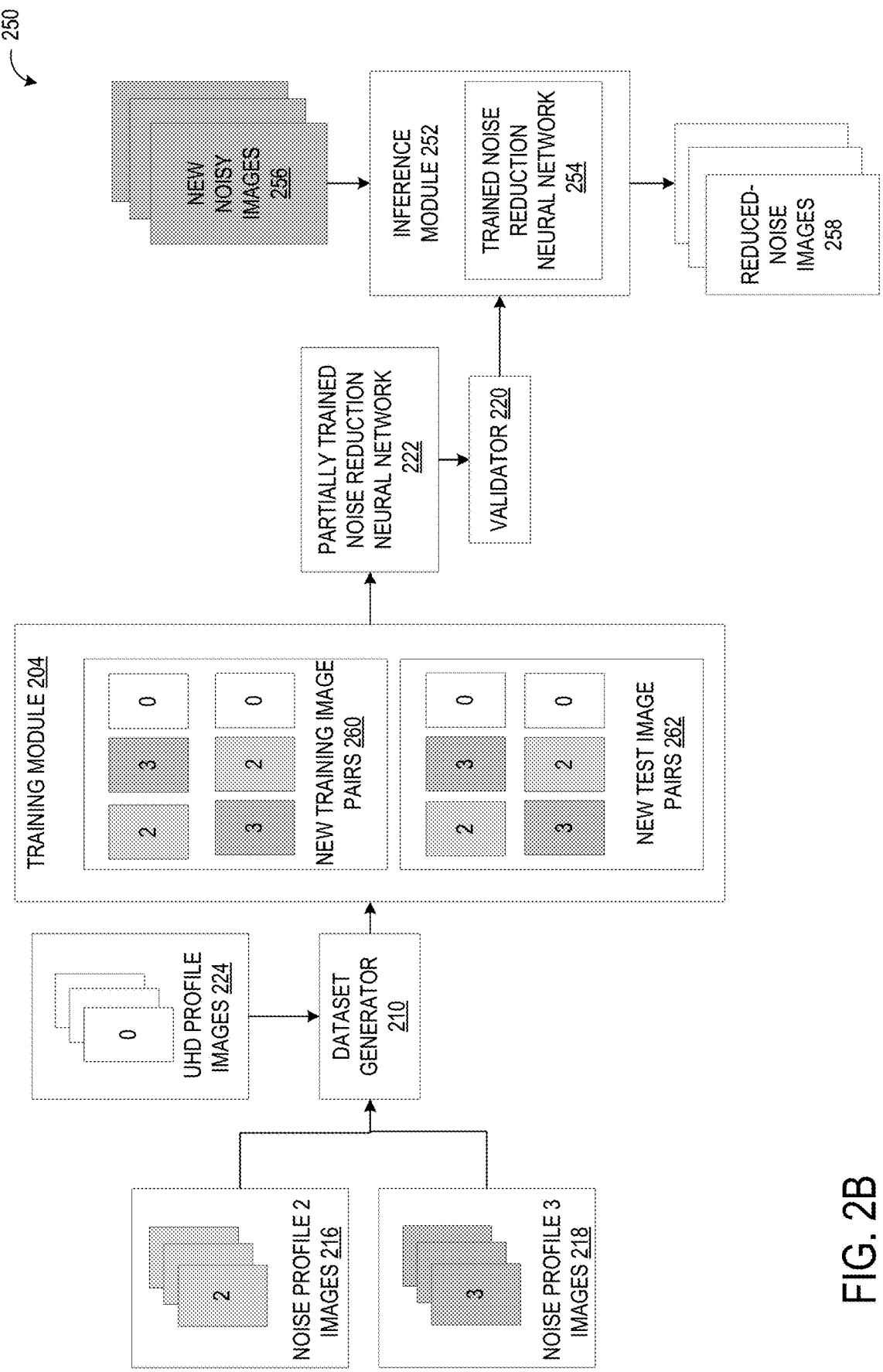
FIG. 2B shows a block diagram of an exemplary embodiment of a noise reduction neural network training system for training a neural network in a second stage.

In a first training stage, the noise reduction neural network model may be trained by an exemplary first stage network training system shown in FIG. 2A, and in a second training stage, the noise reduction neural network model may be trained by an exemplary second stage network training system shown in FIG. 2B. The first training stage may be carried out by executing one or more operations of method 700 of FIG. 7, using input/target image pairs such as the input/target image pairs described in FIGS. 3A, 3B, and 3C. The second training stage may be carried out by executing one or more operations of method 800 of FIG. 8, using input/target image pairs such as the input/target image pairs described in FIGS. 4A and 4B. Unstructured noise in input images, such as the image shown in FIG. 5A, may be reduced in an output image of the noise reduction neural network model after first training stage, as shown in FIG. 5B, and structured noise in the input images may be reduced in an output image of the noise reduction neural network model after the second training stage, as shown in FIG. 5C. After all stages of training have been completed, the trained noise reduction neural network model may be used to denoise new medical images, as shown in FIG. 6.

Referring to FIG. 1, an image processing system 102 of a medical imaging system 100 is shown, in accordance with an embodiment. In some embodiments, at least a portion of image processing 102 is disposed at a device (e.g., edge device, server, etc.) communicably coupled to the medical imaging system 100 via wired and/or wireless connections. In some embodiments, at least a portion of image processing system 102 is disposed at a separate device (e.g., a workstation) which can receive images from the medical imaging system 100 or from a storage device which stores the images/data generated by the medical imaging system 100.

Image processing system 102 includes a processor 104 configured to execute machine readable instructions stored in non-transitory memory 106. Processor 104 may be single core or multi-core, and the programs executed thereon may be configured for parallel or distributed processing. In some embodiments, the processor 104 may optionally include individual components that are distributed throughout two or more devices, which may be remotely located and/or configured for coordinated processing. In some embodiments, one or more aspects of the processor 104 may be virtualized and executed by remotely-accessible networked computing devices configured in a cloud computing configuration.

Non-transitory memory 106 may store a neural network module 108, a network training module 110, an inference module 112, and medical image data 114. Neural network module 108 may include a deep learning network and instructions for implementing the deep learning network to reduce or optionally remove noise from a medical image of the medical image data 114, as described in greater detail below. Neural network module 108 may include one or more trained and/or untrained neural networks and may further include various data, or metadata pertaining to the one or more neural networks stored therein.

Non-transitory memory 106 may further store a training module 110, which comprises instructions for training one or more of the neural networks implementing a deep learning model stored in neural network module 108. Training module 110 may include instructions that, when executed by the processor 104, cause image processing system 102 to conduct one or more of the steps of method 700 for training the one or more neural networks in a first training stage, and method 800 for training the one or more neural networks in a second training stage, discussed in more detail below in reference to FIGS. 7 and 8, respectively. In some embodiments, training module 110 includes instructions for implementing one or more gradient descent algorithms, applying one or more loss functions, and/or training routines, for use in adjusting parameters of the one or more neural networks of neural network module 108. Non-transitory memory 106 also stores an inference module 112 that comprises instructions for denoising new image data with the trained deep learning model.

Non-transitory memory 106 further stores medical image data 114. Medical image data 114 may include for example, medical images acquired via a CT scanner, an X-ray machine, an ultrasound probe, or via a different imaging modality. For example, the medical image data 114 may store images acquired via a CT scanner of the same anatomical features of a same patient. In some embodiments, medical image data 114 may include a plurality of training sets.

In some embodiments, the non-transitory memory 106 may include components disposed at two or more devices, which may be remotely located and/or configured for coordinated processing. In some embodiments, one or more aspects of the non-transitory memory 106 may include remotely-accessible networked storage devices configured in a cloud computing configuration.

Image processing system 102 may be operably/communicatively coupled to a user input device 132 and a display device 134. User input device 132 may comprise one or more of a touchscreen, a keyboard, a mouse, a trackpad, a motion sensing camera, or other device configured to enable a user to interact with and manipulate data within image processing system 102. Display device 134 may include one or more display devices utilizing virtually any type of technology. In some embodiments, display device 134 may comprise a computer monitor, and may display medical images. Display device 134 may be combined with processor 104, non-transitory memory 106, and/or user input device 132 in a shared enclosure, or may be peripheral display devices and may comprise a monitor, touchscreen, projector, or other display device known in the art, which may enable a user to view medical images produced by an medical imaging system, and/or interact with various data stored in non-transitory memory 106.

It should be understood that image processing system 102 shown in FIG. 1 is for illustration, not for limitation. Another appropriate image processing system may include more, fewer, or different components.

Referring to FIG. 2A, an example of a noise reduction neural network training system 200 is shown, which may be used to train a deep learning network such as a noise reduction neural network 202 in a first training stage. During the first training stage, the noise reduction neural network 202 may be trained to detect and reduce or optionally remove unstructured noise from input images, in accordance with one or more operations described in greater detail below in reference to method 700 of FIG. 7. Noise reduction neural network training system 200 may be implemented by one or more computing systems, such as image processing system 202 of FIG. 2, to train the noise reduction neural network to detect and reduce or optionally remove noise from a medical image by interchangeably learning a mapping from medical images with a low noise profile to identical medical images with a high noise profile, and a mapping from the medical images with the high noise profile to the identical medical images with the low noise profile. In an embodiment, noise reduction neural network training system 200 includes a noise reduction neural network 202, to be trained, and a training module 204 that includes a first training dataset comprising a plurality of training pairs of data, such as image pairs divided into training image pairs 206 and test image pairs 208. In other embodiments, the first training dataset may comprise a plurality of training pairs of non-image data (e.g., sinogram data, projection data, etc.) It should be appreciated that while the descriptions herein refer to image data, the examples provided herein are for illustrative purposes, and the noise reduction neural network 202 may be trained on other types of data without departing from the scope of this disclosure. The training module 204 may be the same as or similar to the training module 110 of image processing system 100 of FIG. 1.

A number of training image pairs 206 and test image pairs 208 may be selected to ensure that sufficient training data is available to prevent overfitting, whereby the noise reduction neural network 202 learns to map features specific to samples of the training set that are not present in the test set. Assignment of training and test image pairs is described in greater detail below.

Each image pair of the training image pairs 206 and the test image pairs 208 comprises an input image and a target image, where the input image and the target image are acquired from a region of interest (ROI) of a patient. Additionally, the input image and the target image may have different noise profiles. In one embodiment, the input images and the target images of the training image pairs 206 and the test image pairs 208 are both generated from a parent set of images 212 with a first noise profile (herein, the noise profile 1 images). The noise profile 1 images may have a relatively low amount of noise. For example, the noise profile 1 images may be acquired via a high-dose CT scan of the patient.

The noise reduction neural network training system 200 may include a noise generator 214, which may be used to add noise to medical images. In other words, the noise generator 214 may be used to generate additional sets of medical images from the noise profile 1 images, where each set of medical images of the additional sets of medical images may have a different noise profile with a different amount of added noise. For example, a first amount of additional noise may be added to the noise profile 1 images to generate a set of images 216 with a second noise profile (herein the noise profile 2 images), and a second amount of additional noise may be added to the noise profile 1 images to generate a set of images 218 with a third noise profile (herein the noise profile 3 images). In this way, three sets of medical images of a same region of interest of a subject may be generated, where each set of medical images of the three sets of medical images has a different noise profile (e.g., an original one with relatively low noise, a generated one with moderate noise, and a generated one with relatively high noise). Thus, for each noise profile 1 image, there is a corresponding noise profile 2 image and a corresponding noise profile 3 image which are identical to the noise profile 1 image except for an amount of noise included in the corresponding images In some embodiments, low dose CT image generation tools may be used to simulate effects of low mA acquisition in images, thereby adding unstructured and/or structured noise. For example, sets of medical images with different noise profiles may be created from low dose scans with different levels of mAs, where the different levels of mAs are generated from a standard dose image using the low dose CT image generation tools to generate noise in a sinogram domain and/or an image domain. Structured noise may manifest as streaks or blooming effects in regions of potential photon starvation, while unstructured noise may manifest as random texture noise in the image. In other embodiments, sets of medical images with different noise profiles may be created by performing scans of an imaging phantom at different doses.

The noise reduction neural network training system 200 may include a dataset generator 210, which may be used to generate the training image pairs 206 and the test image pairs 208 of the training module 204. In an embodiment, the dataset generator 210 may pair images of the noise profile 2 images 216 with corresponding images of the noise profile 3 images 218, where each training image pair and/or each test image pair of the training image pairs 206 and the test image pairs 208, respectively, includes an input image of the noise 3 profile images 216 and a target image of the noise profile 2 images 218, or an input image of the noise profile 2 images 218 and a target image of the noise profile 3 images 216. In other words, each image pair of the training image pairs 206 and the test image pairs 208 may include an input image and a target image in a first input/target combination, where the input image is drawn from the noise profile 2 images 216 and the target image is drawn from the noise profile 3 images 218, or in a second input/target combination, where the input image is drawn from the noise profile 3 images 218 and the target image is drawn from the noise profile 2 images 216. Thus, image pairs comprising input images of one noise profile and target images of a different noise profile of the ROI of the patient may be obtained efficiently via an automated process. An example method for generating training data is described in further detail below with respect to FIG. 7.

Once each image pair is generated, the image pair may be assigned to either the training image pairs 206 or the test image pairs 208. In an embodiment, the image pair may be assigned to either the training image pairs 206 or the test image pairs 208 randomly in a pre-established proportion. For example, the image pair may be assigned to either the training image pairs 206 or the test image pairs 208 randomly such that 90% of the image pairs generated are assigned to the training image pairs 206, and 10% of the image pairs generated are assigned to the test image pairs 208. Alternatively, the image pair may be assigned to either the training image pairs 206 or the test image pairs 208 randomly such that 85% of the image pairs generated are assigned to the training image pairs 206, and 15% of the image pairs generated are assigned to the test image pairs 208. It should be appreciated that the examples provided herein are for illustrative purposes, and image pairs may be assigned to the training image pairs 206 dataset or the test image pairs 208 dataset via a different procedure and/or in a different proportion without departing from the scope of this disclosure.

Noise reduction neural network training system 200 may include a validator 220 that validates the performance of the noise reduction neural network 202 against the test image pairs 208. The validator 220 may take as input a trained or partially trained noise reduction neural network 202 and a dataset of test image pairs 208, and may output an assessment of the performance of the trained or partially trained noise reduction neural network 202 on the dataset of test image pairs 208.

Once the noise reduction neural network 202 has been validated, a partially trained noise reduction neural network 222 (e.g., the validated noise reduction neural network 202) may be used to generate a set of images with ultra-low noise profile images 224 (also referred to herein as ultra-high dose (UHD) profile images) from the noise profile 1 images 212 originally used to generate the noise profile 2 and noise profile 3 images. In one embodiment, the images may be generated in accordance with the procedure described below in reference to FIG. 7. The UHD profile images generated by the partially trained noise reduction neural network 222 may be used as ground truth images in a second stage of training, as described below in reference to FIG. 2B.

FIG. 2B shows the noise reduction neural network training system 200 in a second training stage 250. During the second training stage 250, the noise reduction neural network 202 may be trained to detect and reduce or optionally remove structured noise from input images, in accordance with one or more operations described in greater detail below in reference to method 800 of FIG. 8.

During the second training stage 250, the partially trained noise reduction neural network 222 described above in relation to FIG. 2A may be retrained on a second training dataset, which may be same as or substantially similar to the first training dataset. In some embodiments, the partially trained noise reduction neural network 222 is retrained using the training image pairs 206 and the test image pairs 208 of the first training stage. In other embodiments, the data set generator 210 may reallocate the training image pairs 206 and the test image pairs 208 into a new set of training image pairs 260 and new set of test image pairs 262, respectively. The test image pairs 208 and the training image pairs 206 of the first training stage may be combined into a single set of image pairs and reordered based on a new random ordering. Further, the new random ordering may comprise a plurality of kernel-specific new random orderings, each kernel-specific new random ordering corresponding to a different image reconstruction kernel of the noise profile 1 images 212 of FIG. 2A. The single set of image pairs may be subsequently divided into the new set of training image pairs 260 and the new set of test image pairs 262 in accordance with the procedure described above in reference to FIG. 2A. In another embodiment, the new set of training image pairs 260 and the new set of test image pairs 262 may not comprise the test image pairs 208 and the training image pairs 206 of the first training stage, and the new set of training image pairs 260 and the new set of test image pairs 262 may be generated from the noise profile 1 images 212 as described above in reference to FIG. 2A, or may be generated from a new set of noise profile 1 images.

After the new training image pairs 260 and the new test image pairs 262 have been reallocated or regenerated, the new training image pairs 260 and the new test image pairs 262 may be different from the original training image pairs 206 and the original test image pairs 208, respectively. For example, the first training image pair 206 of the first training stage may include different input and target images or a different input/target combination from a first new training image pair 260, the second training image pair 206 of the first training stage may include different input and target images or a different input/target combination from a second new training image pair 260, and so on.

Additionally, each image pair of the new training image pairs 260 and the new test image pairs 262 of the training module 204 may be modified by the dataset generator 210 to include an additional target image. In one embodiment, the additional target image is a corresponding UHD profile image of the UHD profile images 224, where the corresponding UHD profile image is generated by the partially trained noise reduction neural network 222 from a corresponding noise profile 1 image 212 as described above in relation to FIG. 2A.

Figure 8:
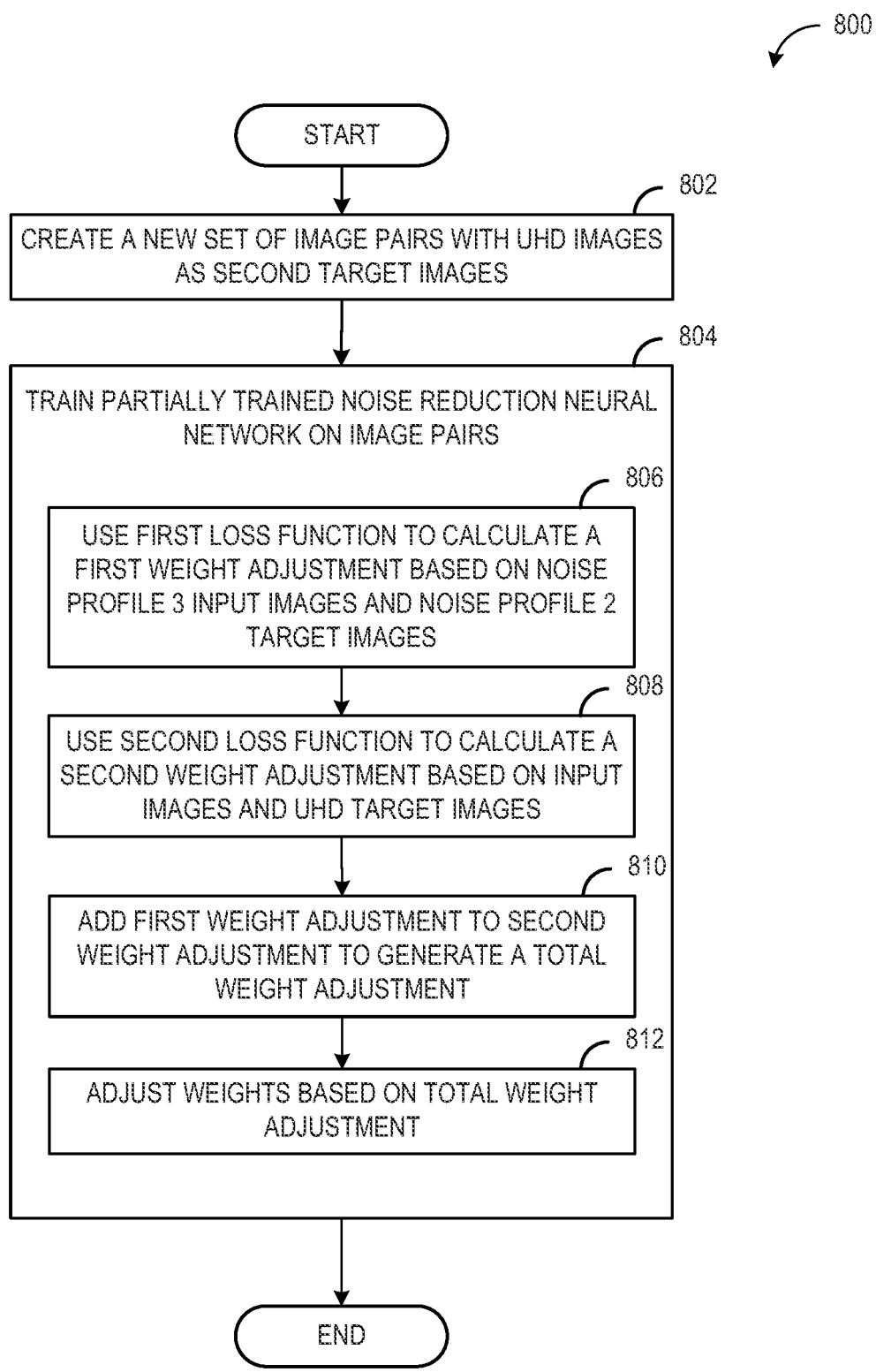
FIG. 8 shows a flowchart of an exemplary method for training the noise reduction neural network during the second stage.

In an embodiment, training of the partially trained noise reduction neural network 222 may be carried out in accordance with one or more steps of method 800 of FIG. 8. Training may be completed when the partially trained noise reduction neural network 222 achieves a minimum error rate in detecting and removing the structured and unstructured noise from the input images of the training image pairs 206, as validated by the validator 220 based on the new test image pairs 262. After the partially trained noise reduction neural network 222 is validated, the partially trained noise reduction neural network 222 is considered fully trained.

Figure 5C:
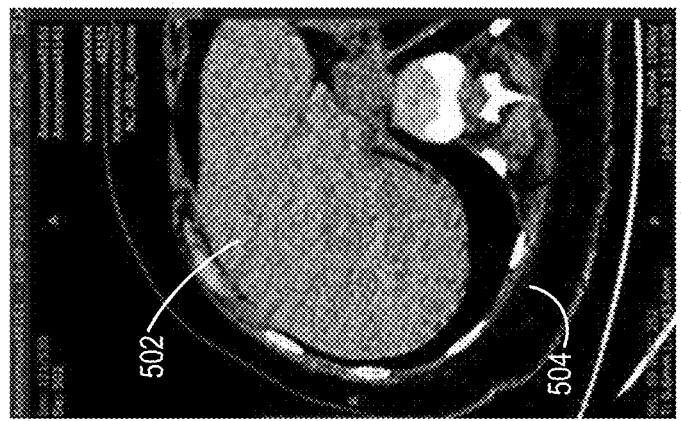
FIG. 5C shows a second example output image produced by the noise reduction neural network after the second stage of training, the second example output image generated from the first example output image.
Figure 5B:
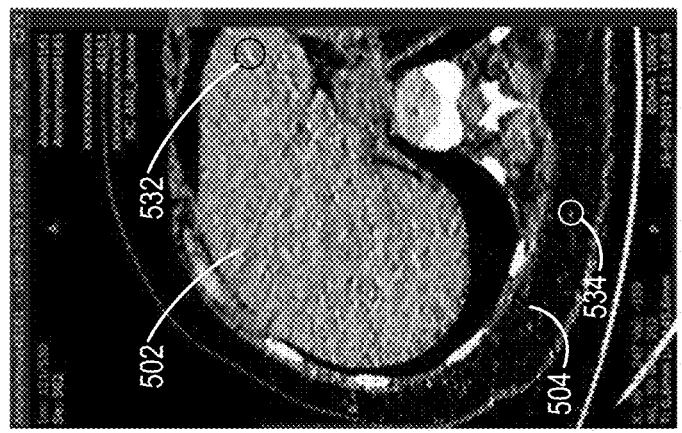
FIG. 5B shows a first example output image produced by the noise reduction neural network after the first stage of training, the first example output image generated from the example input image.
Figure 5A:
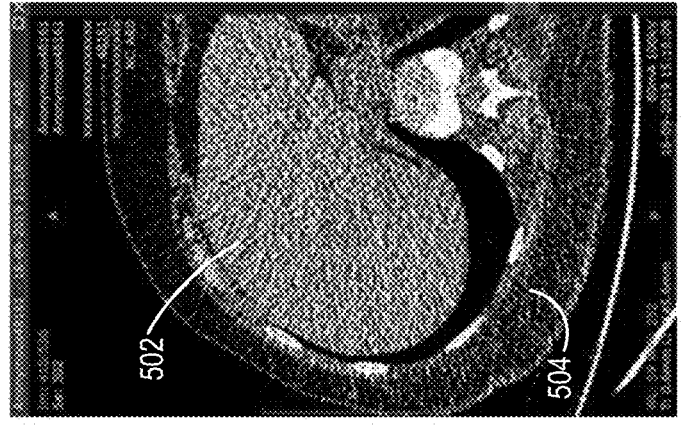
FIG. 5A shows an example input image of the noise reduction neural network during the first stage of training.
Figure 6:
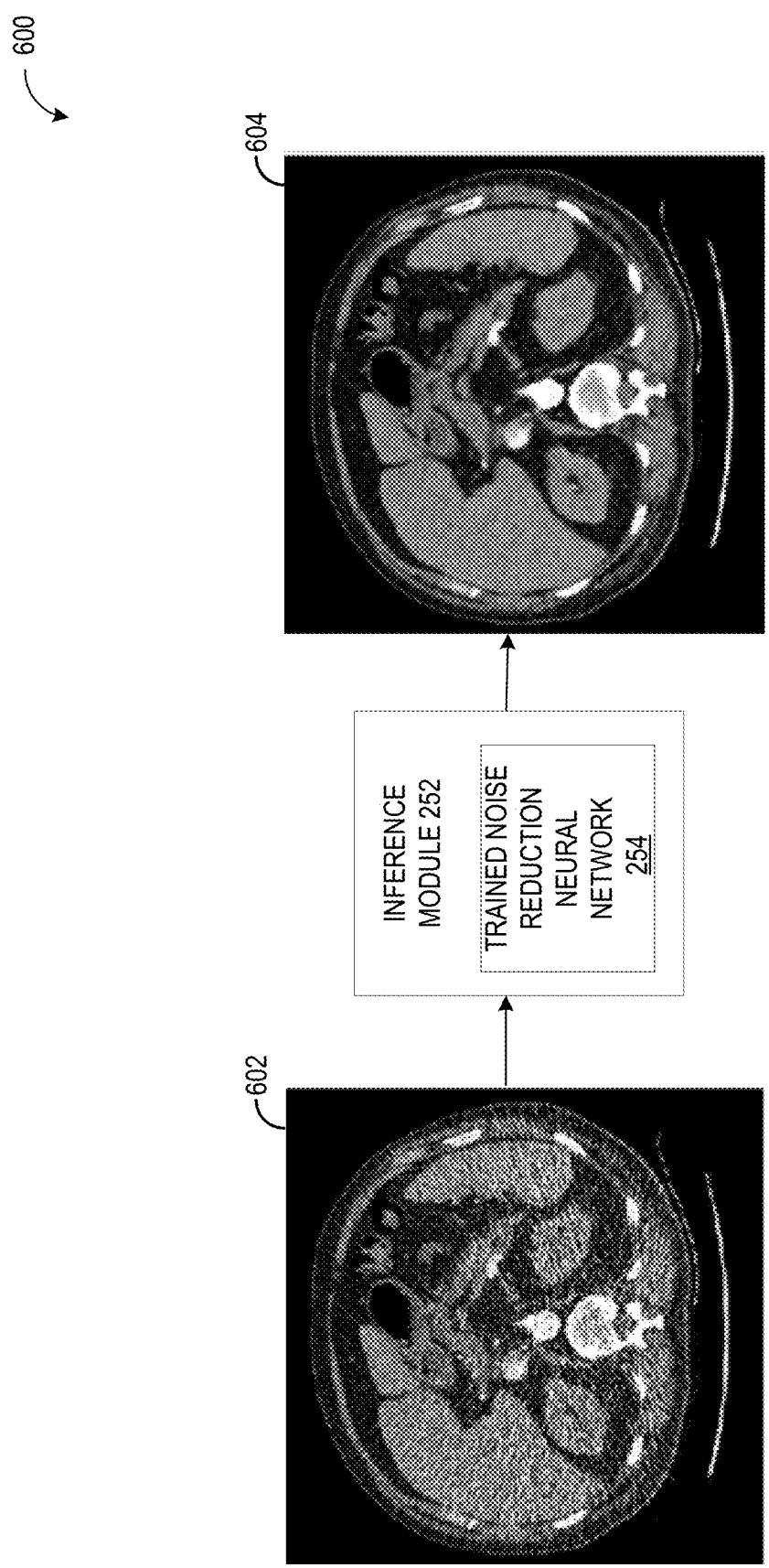
FIG. 6 shows an example output image generated from an example input image by a trained noise reduction neural network.

Referring briefly to FIGS. 5A, 5B, and 5C, example CT images of a ROI of a patient are shown at different stages of training. FIG. 5A shows a first CT image 500, with a first ROI 502 and a second ROI 504. The first CT image 500 is an example of a noisy image, which may be an input image into the noise reduction neural network 202 during the first training stage. For example, the first CT image 500 may be an input image from the noise profile 3 images 218, which may simulate an image acquired by a low-dose CT scan with a milliampere setting of 50 mA. In the first CT image 500, the first ROI 502 and the second ROI 504 have a grainy texture, indicating noise in the first CT image 500. The noise may include both structured noise (e.g., artifacts such as streaks that are correlated with features of the first CT image 500), and unstructured noise (e.g., random variations in pixel brightness that are not correlated with features of the first CT image 500).

FIG. 5B shows a second CT image 530 including the first ROI 502 and the second ROI 504. The second CT image 530 may be an example output image of the partially trained noise reduction neural network 222, after the noise reduction neural network 202 is validated by the validator 220 following completion of the first training stage. In the second CT image 530, the first ROI 502 and the second ROI 504 have a texture that is less grainy, where some unstructured noise has been reduced or removed from the first CT image 500. However, structured noise is still present in the form of artifacts, such as streaks indicated by circle 532 and circle 534.

FIG. 5C shows a third CT image 560 including the first ROI 502 and the second ROI 504. The third CT image 560 may be an example output image of the trained noise reduction neural network 254, after the partially trained noise reduction neural network 222 is validated by the validator 220 following completion of the second training stage. In the third CT image 560, the first ROI 502 and the second ROI 504 have a texture that is less grainy than the first CT image 500 and the second CT image 530, where both the unstructured noise and the structured noise are reduced with respect to the first CT image 500 and the second CT image 530, as evidenced by the disappearance of the streaks indicated by circle 532 and circle 534 of the second CT image 530.

Returning once again to FIG. 2B, the noise reduction neural network training system 200 may include an inference module 252, which comprises a trained noise reduction neural network 254 that has been validated by the validator 220 as described above. The inference module 252 may include instructions for deploying the trained noise reduction neural network 254 to generate one or more reduced-noise images 258 from one or more new noisy images 256. The one or more reduced-noise images 258 may comprise a same number of images as the one or more new noisy images 256, wherein for each image of the one or more new noisy images 256, a corresponding reduced-noise image 258 is produced, such that there is a 1-to-1 correspondence between the one or more new noisy images 256 and the one or more reduced-noise images 258. In this way, the noise reduction neural network training system 200 enables the noise reduction neural network 202 to learn to reduce or optionally remove both structured and unstructured noise from a new set of noisy images.

Referring now to FIG. 6, an example image processing cycle 600 is shown, where an output CT image 604 of a patient is generated from an input CT image 602 of the patient by the inference module 252, where the inference module 252 includes the trained noise reduction neural network 254 of the noise reduction neural network training system 200 of FIGS. 2A and 2B. The input CT image 602 may be a new noisy image of the new noisy images 256 of FIG. 2B. In one example, the new noisy images 256 are acquired from the patient during a low-dose CT scan. The output CT image 604 is a reduced noise image (e.g., of the reduced noise images 258 of FIG. 2B). As a result of the reduced noise, the output CT image 604 may be of a quality (e.g., having a noise profile) similar to or higher than a CT image acquired during a higher-dose CT scan.

Figure 7:
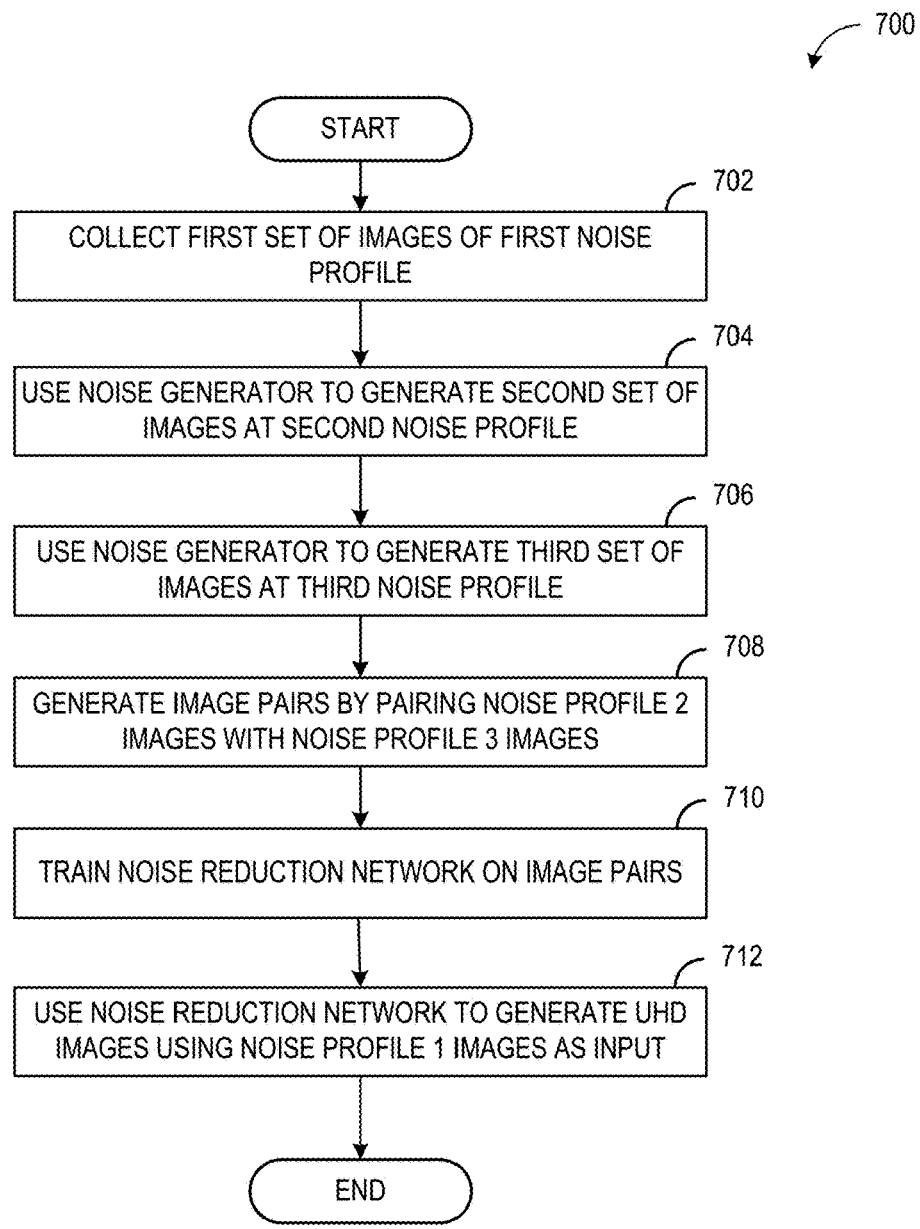
FIG. 7 shows a flowchart of an exemplary method for training the noise reduction neural network during the first stage.

Referring now to FIG. 7, a flowchart is shown of a method 700 for training a noise reduction neural network in a first training stage. The noise reduction neural network may be a non-limiting example of the noise reduction neural network 202 of the noise reduction neural network training system 200 of FIG. 2A, according to an exemplary embodiment. In some embodiments, the noise reduction neural network may be a deep neural network with a plurality of hidden layers. Method 700 may be executed by a processor of an image processing system, such as the image processing system 102 of FIG. 1. In an embodiment, some operations of method 700 may be stored in non-transitory memory of the image processing system (e.g., in a training module such as the training module 110 of the image processing system 102 of FIG. 1) and executed by a processor of the image processing system (e.g., the processor 104 of image processing system 102 of FIG. 1). The noise reduction neural network may be trained on training data comprising one or more sets of image pairs. Each image pair of the one or more sets of image pairs may comprise medical images with different amounts of noise, as described below. In some embodiments, the one or more sets of image pairs may be stored in an medical image dataset of an image processing system, such as the medical image data 114 of image processing system 102 of FIG. 1.

Method 700 begins at 702, where method 700 includes collecting an initial dataset of images of a first noise profile (noise profile 1). The images of the first noise profile may have a low level of noise. For example, the noise profile 1 images may be acquired via a high-dose CT scan of a subject. In one embodiment, the noise profile 1 images are acquired via a high-dose CT scan with a milliampere setting of 100 mA.

At 704, method 700 includes using a noise generator to generate a first noisy dataset of images at a second noise profile (noise profile 2). For example, the noise generator may take the noise profile 1 images as input, and output a set of images with the second noise profile, where the noise profile 2 images include a greater amount of noise than the noise profile 1 images. In one embodiment, the noise profile 2 images have a noise profile equivalent to a low-dose CT scan with a milliampere setting of 75 mA.

Similarly, at 706, method 700 includes using the noise generator to generate a second noisy dataset of images at a third noise profile (noise profile 3). For example, the noise generator may take the noise profile 1 images as input, and output a set of images with the third noise profile, where the noise profile 3 images include a greater amount of noise than the noise profile 2 images and the noise profile 1 images. In one embodiment, the noise profile 3 images have a noise profile equivalent to a low-dose CT scan with a milliampere setting of 50 mA. Thus, as described above in reference to FIG. 2A, three distinct sets of medical images may be generated, covering a same region of interest of a subject, where each set of medical images of the three sets of medical images has a different noise profile (e.g., an initial dataset of the noise profile 1 with relatively low noise; the first noisy dataset of noise profile 2 with moderate noise; and the second noisy dataset of noise profile 3 with relatively high noise).

At 708, method 700 includes generating a plurality of image pairs by pairing images from the first noisy dataset of images (e.g., the noise profile 2 images) and the second noisy dataset of images (e.g., the noise profile 3 images). In an embodiment, noise profile 2 images and the noise profile 3 images may be paired by a dataset generator, such as the dataset generator 210 of the noise reduction neural network training system 200 of FIG. 2A. As described above, the dataset generator may pair images of the noise profile 2 images with corresponding images of the noise profile 3 images, such that each image pair of the plurality of image pairs includes either an input image of the noise 3 profile images and a target image of the noise profile 2 images, or an input image of the noise 2 profile images and a target image of the noise 3 profile images. For example, a first image pair may include a first noise 3 profile input image of the second noisy dataset and a first noise 2 profile target image of the first noisy dataset, the first noise 3 profile input image and the first noise 2 profile target image derived from a first noise 1 profile image of the initial dataset of images; a second image pair may include a second noise 2 profile input image of the first noisy dataset and a second noise 3 profile target image of the second noisy dataset, the second noise 2 profile input image and the second noise 3 profile target image derived from a second noise 1 profile image of the initial dataset of images; a third image pair may include a third noise 3 profile input image of the second noisy dataset and a third noise 2 profile target image of the first noisy dataset, the third noise 3 profile input image and the third noise 2 profile target image derived from a third noise 1 profile image of the initial dataset of images; and so on.

In some embodiments, the dataset generator may generate the first and second noisy datasets where different input/target combinations may alternate, as described in the example above. In other embodiments, the dataset generator may generate the first and second noisy datasets where different input/target combinations are randomly selected. For example, the first image pair may include an input image and a target image either in a first input/target combination where the input image has less noise than the target image, or in a second input/target combination where the input image has more noise than the target image; the second image pair may include an input image and a target image either in the first input/target combination where the input image has less noise than the target image, or in the second input/target combination where the input image has more noise than the target image; and so on. In still other embodiments, the dataset generator may generate the first and second noisy datasets with a different order or arrangement of input/target combinations.

In some embodiments, the initial dataset of noise profile 1 images may be generated from reconstruction frequency kernels. In embodiments where the initial dataset of images is generated from reconstruction frequency kernels, corresponding image data of the noise 2 profile images of the first noisy dataset and noise 3 profile images of the second noisy dataset may be grouped by reconstruction frequency kernel for training. For example, a first portion of training pairs may include images from a first portion of the first noisy dataset (corresponding to a first reconstruction frequency kernel of the initial dataset of noise profile 1 images) and a corresponding first portion of the second noisy dataset (also corresponding to the first reconstruction frequency kernel of the initial dataset of noise profile 1 images); a second portion of training pairs may include images from a second portion of the first noisy dataset (corresponding to a second reconstruction frequency kernel of the initial dataset of noise profile 1 images) and a corresponding second portion of the second noisy dataset (also corresponding to the second reconstruction frequency kernel of the initial dataset of noise profile 1 images); and so on. In embodiments where different input/target combinations are randomly selected, the input/target combinations may be randomly selected within groupings of reconstruction frequency kernels and not across groupings of reconstruction frequency kernels.

Once the image pairs have been created, the image pairs may be divided into training image pairs and test image pairs, as described above in reference to FIG. 2A.

Figure 3A:
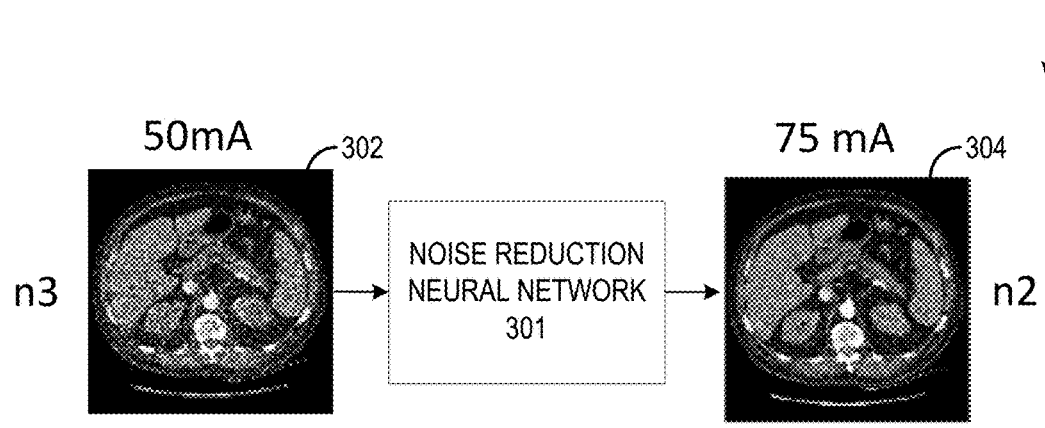
FIG. 3A shows a first example input image and a first example target image used to train the noise reduction neural network in the first stage.
Figure 3B:
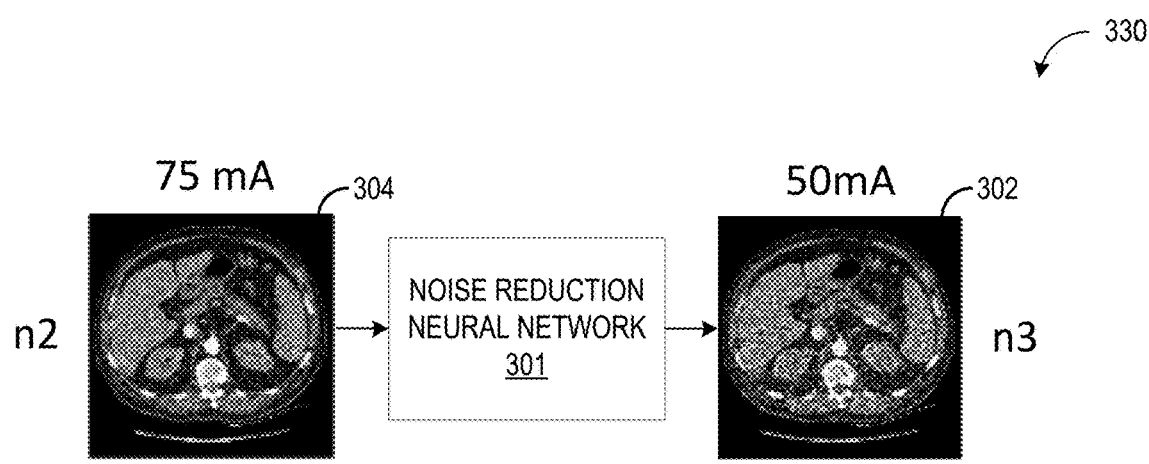
FIG. 3B shows a second example input image and a second example target image used to train the noise reduction neural network in the first stage.

Referring briefly to FIGS. 3A and 3B, example noise profile 2 images and noise profile 3 images in different configurations of input/target image pairs during training are shown. FIG. 3A shows a configuration 300 with the first input/target combination, where a noise profile 3 image 302 (e.g., equivalent to a low-dose CT scan with a milliampere setting of 50 mA) of an ROI is used as an input image into a noise reduction neural network 301 (e.g., the noise reduction neural network 202 of FIG. 2), and a corresponding noise profile 2 image 304 (e.g., equivalent to a low-dose CT scan with a milliampere setting of 75 mA) of the ROI is used as the target image. In contrast, FIG. 3B shows a configuration 330 with the second input/target combination, where the noise profile 2 image 304 of the ROI is used as an input image into a noise reduction neural network 301, and the corresponding noise profile 3 image 302 is used as the target image. For each image pair of the plurality of image pairs, either the noise profile 2 image 304 of the ROI is used as the input image into the noise reduction neural network 301, and the corresponding noise profile 3 image 302 of the ROI is used as the target image, or the noise profile 3 image 302 of the ROI is used as the input image into the noise reduction neural network 301, and the corresponding noise profile 2 image 304 of the ROI is used as the target image.

Returning to method 700, at 710, method 700 includes training the noise reduction network on the image pairs. More specifically, training the noise reduction network on the image pairs includes training the noise reduction network to learn to map images of one noise profile (e.g., the noise profile 2 images or the noise profile 3 images) to a different noise profile (e.g., the noise profile 3 images or the noise profile 2 images, respectively). In some embodiments, the noise reduction neural network may comprise a generative neural network. In some embodiments, the noise reduction neural network may comprise a generative neural network having a U-net architecture. In some embodiments, the noise reduction neural network may include one or more convolutional layers, which in turn comprise one or more convolutional filters (e.g., a convoluted neural network architecture). The convolutional filters may comprise a plurality of weights, wherein the values of the weights are learned during a training procedure. The convolutional filters may correspond to one or more visual features/patterns, thereby enabling the noise reduction neural network to identify and extract features from the medical images. In other embodiments, the noise reduction neural network may not be a convolutional neural network, and may be a different type of neural network.

Training the noise reduction network on the image pairs includes iteratively inputting an input image of each training image pair into an input layer of the noise reduction neural network. In some embodiments, each pixel intensity value of the input image may input into a distinct neuron of the input layer of the noise reduction neural network. The noise reduction neural network maps the input image to an output image by propagating the input image from the input layer, through one or more hidden layers, until reaching an output layer of the noise reduction neural network. In some embodiments, the output of the noise reduction neural network comprises a 2D matrix of values, wherein each value corresponds to a distinct intensity of a pixel of the input image, and wherein a distinct intensity of each pixel of the output image generates a reconstruction of the input image where an amount of noise in one or more regions of the output image is lower than an amount of noise in the one or more regions of the input image.

The noise reduction neural network may be configured to iteratively adjust one or more of the plurality of weights of the noise reduction neural network in order to minimize an loss function, based on an assessment of differences between the input image and the target image comprised by each image pair of the training image pairs. In one embodiment, the loss function is a Mean Absolute Error (MAE) loss function, where differences between the input image and the target image are compared on a pixel-by-pixel basis and summed. In another embodiment, the loss function may be a Structural Similarity Index (SSIM) loss function. In other embodiments, the loss function may be a minimax loss function, or a Wasserstein loss function. It should be appreciated that the examples provided herein are for illustrative purposes, and other types of loss functions may be used without departing from the scope of this disclosure.

The weights and biases of the noise reduction neural network may be adjusted based on a difference between the output image and the target (e.g., ground truth) image of the relevant image pair. The difference (or loss), as determined by the loss function, may be back-propagated through the neural learning network to update the weights (and biases) of the convolutional layers. In some embodiments, back propagation of the loss may occur according to a gradient descent algorithm, wherein a gradient of the loss function (a first derivative, or approximation of the first derivative) is determined for each weight and bias of the deep neural network. Each weight (and bias) of the noise reduction neural network is then updated by adding the negative of the product of the gradient determined (or approximated) for the weight (or bias) with a predetermined step size. Updating of the weights and biases may be repeated until the weights and biases of the noise reduction neural network converge, or the rate of change of the weights and/or biases of the deep neural network for each iteration of weight adjustment are under a threshold.

In order to avoid overfitting, training of the noise reduction neural network may be periodically interrupted to validate a performance of the noise reduction neural network on the test image pairs. In an embodiment, training of the noise reduction neural network may end when a performance of the noise reduction neural network on the test image pairs converges (e.g., when an error rate on the test set converges on or to within a threshold of a minimum value). In this way, the noise reduction neural network may be trained to generate a reconstruction of an input image, where the reconstruction of the input image includes less noise than the input image.

In some embodiments, an assessment of the performance of the noise reduction neural network may include a combination of a minimum error rate and a quality assessment, or a different function of the minimum error rates achieved on each image pair of the test image pairs and/or one or more quality assessments, or another factor for assessing the performance of the noise reduction neural network. It should be appreciated that the examples provided herein are for illustrative purposes, and other loss functions, error rates, quality assessments, or performance assessments may be included without departing from the scope of this disclosure.

At 712, method 700 includes using the noise reduction neural network to generate a set of ultra-low noise profile images (also referred to herein as ultra-high dose (UHD) profile images) using the first noisy dataset of images (e.g., the noise profile 1 images) as input. In other words, once the noise reduction neural network has been trained using the noise profile 2 images and the noise profile 3 images as inputs and target interchangeably, the noise profile 1 images are fed into the noise reduction neural network. As a result of training during the first stage of training, the noise reduction neural network is able to reduce a level of unstructured noise in input images, whereby an output of the noise reduction neural network is the set of ultra-low noise profile (UHD) images. The UHD images may have less noise than the noise profile 1 images used to generate the noise profile 2 images and the noise profile 3 images. The UHD images may be used to further train the noise reduction neural network in a second stage of training, as described below in reference to FIG. 8.

Figure 3C:
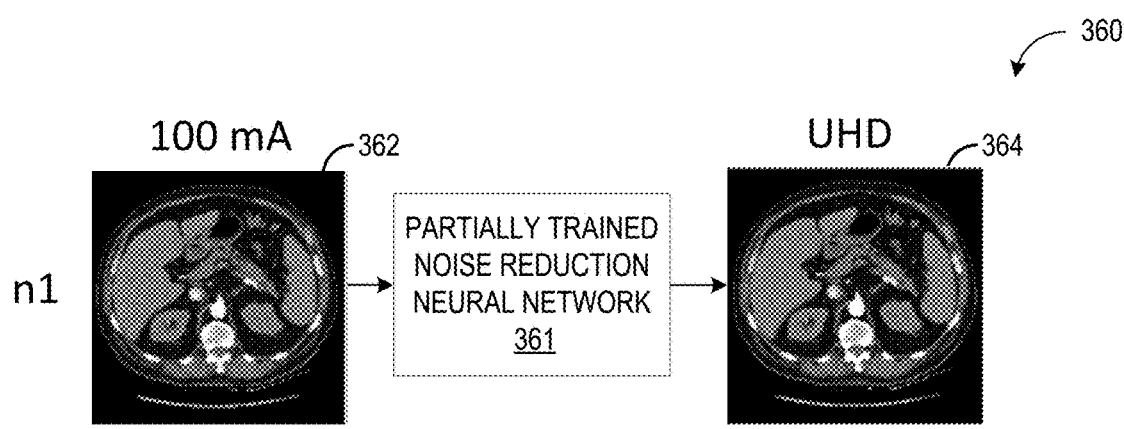
FIG. 3C shows a third example input image and a third example target image used to train the noise reduction neural network in the first stage.

Referring briefly to FIG. 3C, an example UHD image generation configuration 360 is shown for generating the UHD profile images after partial training of the noise reduction neural network. Each UHD profile image 364 is generated by a partially trained noise reduction neural network 361 (e.g., the partially trained noise reduction neural network 222 of FIG. 2A) from a corresponding noise profile 1 image 362 of the noise profile 1 images (e.g., acquired via a high-dose CT scan with a milliampere setting of 100 mA). The UHD profile images generated by the partially trained noise reduction neural network 361 may be used as ground truth images in the second stage of training, as described below.

Referring now to FIG. 8, a flowchart is shown of a method 800 for training a noise reduction neural network in a second stage of training, where the noise reduction neural network may be a non-limiting example of the partially trained noise reduction neural network 222 of the noise reduction neural network training system 200 of FIGS. 2A and 2B, according to an exemplary embodiment. Method 800 may be executed by a processor of an image processing system, such as the image processing system 102 of FIG. 1. In an embodiment, some operations of method 800 may be stored in non-transitory memory of the image processing system (e.g., in a training module such as the training module 110 of the image processing system 102 of FIG. 1) and executed by a processor of the image processing system (e.g., the processor 104 of image processing system 102 of FIG. 1). The partially trained noise reduction neural network may be further trained on training data comprising one or more sets of image pairs, which may be stored in an medical image dataset of an image processing system, such as the medical image data 114 of image processing system 102 of FIG. 1.

Method 800 begins at 802, where method 800 includes creating a new set of image pairs with UHD images as additional target images. In other words, in an embodiment, the noise reduction neural network is retrained during the second stage of training using the same plurality of image pairs as in the first stage (e.g., the noise profile 2 images and the noise profile 3 images), where each image pair includes an additional target UHD image. Additionally, as described above in reference to FIG. 2B, an order of the image pairs may be changed, for example, to a new random ordering, and a plurality of new image pairs of the new random ordering may be divided into a new set of training image pairs and a new set of test image pairs. The input/target combinations may also alternate in an ordered or random arrangement, as described above in reference to FIG. 2B.

For example, the first new training image pair may include a new first noise 3 profile input image and a new first noise 2 profile target image, and an additional first UHD profile target image generated from the first noise 1 profile image; the second new training image pair may include a new second noise 2 profile input image and a new second noise 3 profile target image, and an additional second UHD profile target image generated from the second noise 1 profile image; the third new training image pair may include a new third noise 2 profile input image and a new third noise 3 profile target image, and an additional third UHD profile target image generated from the third noise 1 profile image; and so on.

At 804, method 800 includes training the partially trained noise reduction network on the image pairs. Training of the partially trained noise reduction network may be performed substantially as described above in reference to the first stage of training of FIG. 7. However, during the second stage of training, a respective input image may be alternately paired with both respective target images. Thus, at 806, training the partially trained noise reduction network on the image pairs may include using a first loss function to calculate a first weight adjustment based on a difference between an output of the partially trained noise reduction network given a noise profile 3 or 2 input image and a noise profile 2 or 3 target image, respectively (e.g., in either input/target combination), while at 808, training the partially trained noise reduction network on the image pairs may include using a second loss function to calculate a second weight adjustment based on a difference between an output of the partially trained noise reduction network given the input image (e.g., either a noise profile 3 image or a noise profile 2 image) and a UHD target image. In one embodiment, the first loss function is a MAE loss function, and the second loss function is a Structural Similarity Index (SSIM) loss function.

For example, during retraining of the partially trained noise reduction neural network, when the partially trained noise reduction neural network receives a first new training image pair, a new first noise 3 profile input image may be paired with a new first noise 2 profile target image (e.g., in a first input/target combination) for a first weight adjustment calculation in accordance with the first loss function, and the new first noise 3 profile input image may subsequently be paired with the first UHD profile target image for a second weight adjustment calculation in accordance with the second loss function. When the partially trained noise reduction neural network receives a second new training image pair, a new second noise 2 profile input image may be paired with a new second noise 3 profile target image (e.g., in a second input/target combination) for the first weight adjustment calculation in accordance with the first loss function, and the new second noise 3 profile input image may subsequently be paired with the first UHD profile target image for the second weight adjustment calculation in accordance with the second loss function. By calculating the second weight adjustments based on the second loss function and the UHD target images, structured noise (e.g., artifacts, streaks, etc.) may be reduced or removed from the noise profile 3 and/or noise profile 2 input images. By calculating the first weight adjustments based on the first loss function and the noise profile 2 and noise profile 3 input images and target images, a detection and removal of unstructured noise learned by the partially trained noise reduction neural network during the first stage of training may be reinforced and maintained. In this way, the partially trained noise reduction neural network may learn to detect and reduce or remove both structured noise and unstructured noise from each respective noise profile 3 input image or each respective noise profile 2 input image of each new training image pair.

At 810, method 800 includes adding the first weight adjustment to the second weight adjustment to calculate a total weight adjustment. At 812, method 800 includes adjusting a plurality of weights of the partially trained noise reduction neural network based on the total weight adjustment (e.g., the total weight adjustment may be backpropagated through the partially trained noise reduction neural network in accordance with a backpropagation algorithm).

In other words, in a first step of the second training stage (described above at 806), the first loss function is used to calculate the first weight adjustment, where the partially trained noise reduction neural network may be trained to relearn and/or refine the mapping from the third noise profile characterized by the noise profile 3 images, to the second (lower) noise profile characterized by noise profile 2 images learned in the first training stage, or the partially trained noise reduction neural network may be trained to relearn and/or refine the mapping from the second (lower) noise profile characterized by the noise profile 2 images, to the third (higher) noise profile characterized by noise profile 3 images. In a second step of the second training stage (described above at 808), the second loss function is used to calculate the second weight adjustment, where the partially trained noise reduction neural network may be trained to learn a mapping from the input images of the first step (e.g., either the third noise profile characterized by the noise profile 3 images or the second noise profile characterized by the noise profile 2 images), to the ultra-low noise profile characterized by the UHD images. The first weight adjustment and the second weight adjustment are then summed to backpropagate a total weight adjustment. In this way, the partially trained noise reduction neural network may improve detection of the unstructured noise in the input images (e.g., noise that is not correlated with features of the ROI common to both the input images and the target images) as a result of applying the first weight adjustment, while learning to detect and reduce or optionally remove structured noise as a result of applying the second weight adjustment.

Figure 4A:
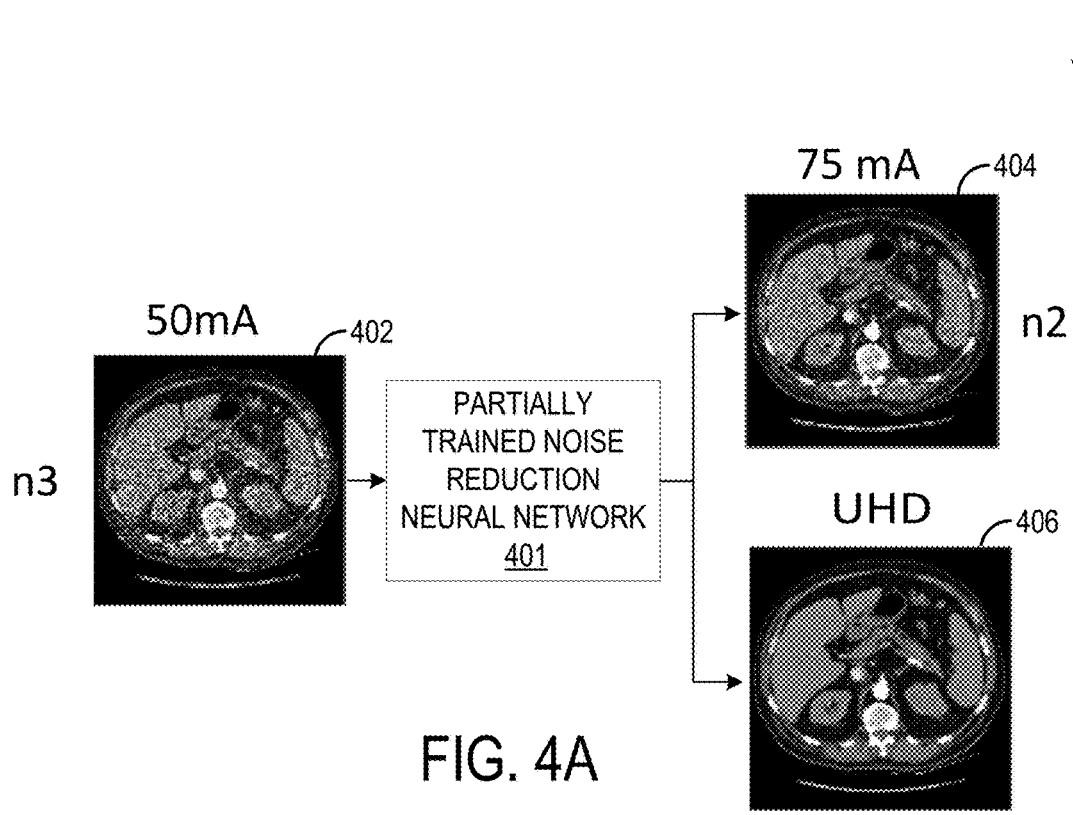
FIG. 4A shows a first example input image and a first set of example target images used to train the noise reduction neural network in the second stage.
Figure 4B:
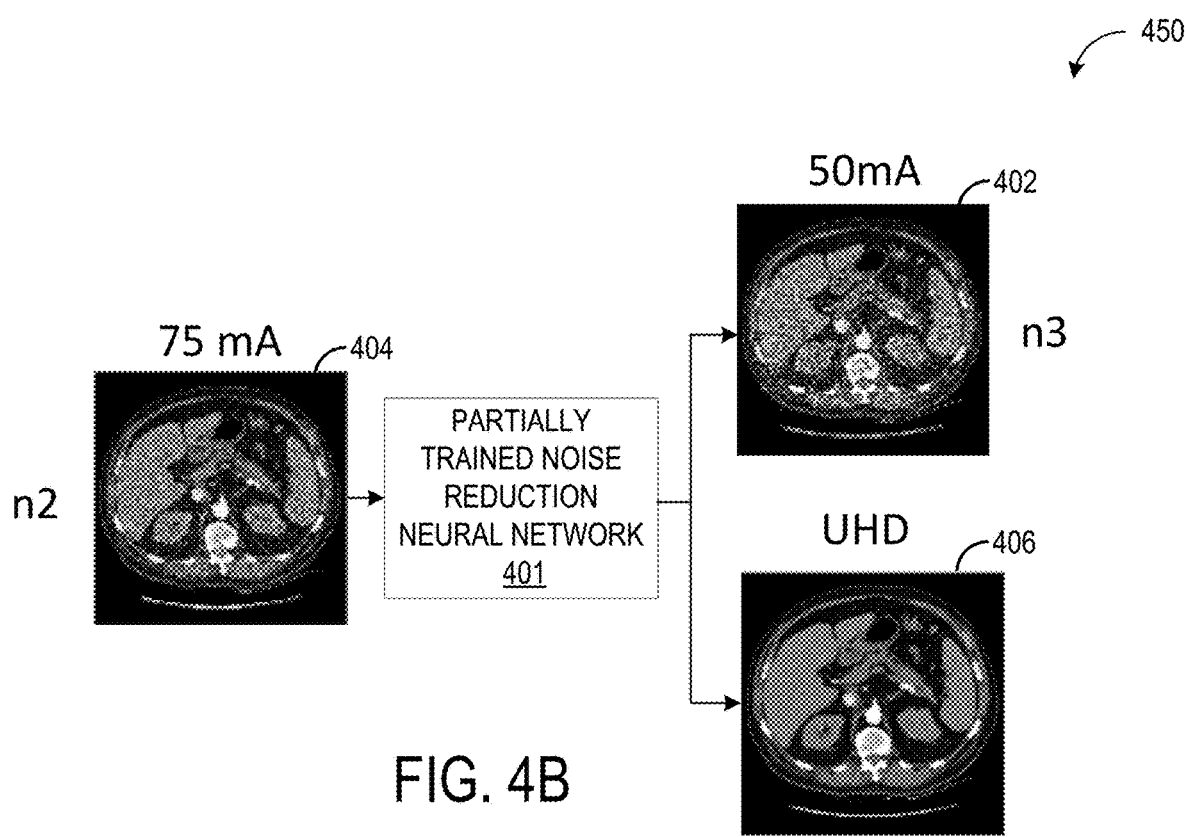
FIG. 4B shows a second example input image and a second set of example target images used to train the noise reduction neural network in the second stage.

Referring briefly to FIGS. 4A and 4B, example noise profile 2 images, noise profile 3 images, and UHD profile images in two different example configurations of input/target image pairs during training are shown. FIG. 4A shows a first input/target image pair configuration 400, where for one image pair of the input/target image pairs, a noise profile 3 image 402 of the noise profile 3 images (e.g., equivalent to a low-dose CT scan with a milliampere setting of 50 mA) of an ROI is used as an input image into a partially trained noise reduction neural network 401 (e.g., the partially trained noise reduction neural network 222 of FIGS. 2A and 2B), a corresponding noise profile 2 image 404 of the noise profile 2 images (e.g., equivalent to a low-dose CT scan with a milliampere setting of 75 mA) of the ROI is used as a first target image, and a corresponding UHD profile image 406 of the UHD profile images (e.g., equivalent to an ultra-high dose CT scan with a milliampere setting greater than 100 mA) of the ROI is used as a second target image. During the second training stage, the first weight adjustment and the second weight adjustment may be calculated and subsequently added to generate the total weight adjustment, where the first weight adjustment may be based on minimizing an error of a first loss function between the input image and the first target image, and the second weight adjustment may be based on minimizing an error of a second loss function between the input image and the second target image.

In contrast, FIG. 4B shows a second input/target image pair configuration 450, where for one image pair of the input/target image pairs, the noise profile 2 image 404 (e.g., equivalent to a low-dose CT scan with a milliampere setting of 75 mA) of the ROI is used as the input image into the partially trained noise reduction neural network 401, the corresponding noise profile 3 image 402 (e.g., equivalent to a low-dose CT scan with a milliampere setting of 50 mA) of the ROI is used as the first target image, and the corresponding UHD profile image 406 of the UHD profile images (e.g., equivalent to an ultra-high dose CT scan with a milliampere setting greater than 100 mA) of the ROI is used as the second target image. As in FIG. 4A, the first weight adjustment and the second weight adjustment may be calculated and subsequently added to generate the total weight adjustment, which may be applied during backpropagation.

Thus, unstructured noise in image data may be detected and reduced or optionally removed by training the noise reduction neural network in a first stage, with the two sets of data with different noise levels used interchangeably. Structured noise in the data may be detected and reduced or optionally removed by retraining the noise reduction neural network in a second stage, using ultra-low noise UHD images as additional target data. Different loss functions may be used for weight and bias adjustments when using the using ultra-low noise UHD images as the additional target data. By training the noise reduction neural network in the first stage, using a partially trained noise reduction neural network to generate the ultra-low noise UHD images, and retraining the partially trained noise reduction neural network using the ultra-low noise UHD images as target images, a trained noise reduction neural network model may be created that may reduce or optionally remove both structured and unstructured noise from new noisy input images. As a result, a quality of low-dose medical images acquired over a short scan duration may be increased to a higher quality associated with high-dose medical images acquired over a longer scan duration. By denoising the low-dose medical images, a set of higher quality images may be generated without exposing the patient to a higher amount of radiation of a high-dose CT scan, thereby reducing a risk to the patient. An additional advantage of using the noise reduction neural network to denoise medical images is that the scan duration may be decreased, leading to increased patient throughput and an improved patient experience.

The technical effect of training a noise reduction neural network to reduce or optionally remove structured and unstructured noise from image data is that images with relatively low noise may be generated from low-dose images with relatively high noise, thereby reducing an amount of radiation subjects are exposed to.

The disclosure also provides support for a multi-stage deep learning method, comprising: training a deep learning network using a first set of training pairs, where a first portion of the first set of training pairs includes input data from a first noisy dataset with a first noise level and target data from a second noisy dataset with a second noise level, and a second portion of the first set of training pairs includes input data from the second noisy dataset with the second noise level and target data from the first noisy dataset with the first noise level, generating an ultra-low noise data equivalent based on a low noise data fed into the trained deep learning network, the low noise data having a noise level lower than the noise levels of the first noisy dataset and the second noisy dataset, the ultra-low noise data equivalent having a noise level lower than the low noise data, and retraining the deep learning network on a second set of training pairs generated in a same manner as the first set of training pairs using the target data of the second set of training pairs in a first retraining step, and using the ultra-low noise data equivalent as target data in a second retraining step. In a first example of the method, the first dataset is generated by adding a first amount of noise to the low noise data, and the second dataset is generated by adding a second amount of noise to the low noise data, the second amount of noise greater than the first amount of noise, and wherein each image of the first dataset corresponds to an image of the second dataset. In a second example of the method, optionally including the first example, the first noisy dataset is created by performing a scan of an imaging phantom at a first dose, and the second noisy dataset is created by performing a scan of the imaging phantom at a second dose. In a third example of the method, optionally including one or both of the first and second examples, each image pair of the first set of training pairs includes one of: a first input/target combination including an input image of the first noisy dataset and a corresponding target image of the second noisy dataset, and a second input/target combination including an input image of the second noisy dataset and a corresponding target image of the first noisy dataset. In a fourth example of the method, optionally including one or more or each of the first through third examples, the training pairs include a random selection of image pairs of the first input/target combination and image pairs of the second input/target combination. In a fifth example of the method, optionally including one or more or each of the first through fourth examples, retraining the deep learning network with the training pairs and with the ultra-low noise data equivalent as target data further comprises: for each image pair of the second set of training pairs: during the first retraining step, calculating a result of a first loss function using the input data and the target data of the image pair, during the second retraining step, calculating a result of a second loss function using the input data of the image pair and the ultra-low noise data equivalent as the target data, and adjusting a plurality of weights of the deep learning network based on a combination of the result of the first loss function and the result of the second loss function. In a sixth example of the method, optionally including one or more or each of the first through fifth examples, the combination of the result of the first loss function and the result of the second loss function is a summation of the result of the first loss function and the result of the second loss function. In a seventh example of the method, optionally including one or more or each of the first through sixth examples, the first loss function is one of a Mean Absolute Error (MAE) loss function, a perceptual loss function, a minimax loss function, and a Wasserstein loss function. In an eighth example of the method, optionally including one or more or each of the first through seventh examples, the second loss function is a Structural Similarity Index (SSIM) loss function. In a ninth example of the method, optionally including one or more or each of the first through eighth examples, the first noisy dataset, the second noisy dataset, and the low noise data include one of computerized tomography (CT) imaging data, magnetic resonance imaging (MRI) data, x-ray data, positron emission tomography (PET) data, ultrasound image data, sinogram data, and k-space data. In a tenth example of the method, optionally including one or more or each of the first through ninth examples, the low-noise data is CT image data generated from reconstruction frequency kernels, and the CT image data of the first noisy dataset and the second noisy dataset is grouped by reconstruction frequency kernel during training.

The disclosure also provides support for an image processing system comprising: a noise reduction neural network, a first training set of images having a first noise profile, a second training set of images with a second noise profile, the second noise profile having more noise than the first, low noise profile, a third training set of images with a third noise profile, the third noise profile having more noise than the second noise profile, a processor communicably coupled to a non-transitory memory storing the trained noise reduction neural network and including instructions that when executed cause the processor to: generate a second training set of images with a second noise profile by adding a first amount of noise to the first training set of images, generate a third training set of images with a third noise profile by adding a second amount of noise to the first training set of images, in a first training stage, train the noise reduction neural network to reduce or optionally remove unstructured noise from the second training set of images and the third training set of images, deploy the partially trained noise reduction neural network to output a fourth training set of images with a fourth noise profile, the fourth noise profile including a lesser amount of noise than the first noise profile, in a second training stage, retrain the noise reduction neural network on the second training set of images, the third training set of images, and the fourth training set of images to reduce or optionally remove structured noise from the second training set of images and the third training set of images, deploy the trained noise reduction neural network to generate noise-reduced images from a new noisy images, the noise-reduced images having less structured and unstructured noise than the new noisy images, and display the noise-reduced images via a display device of the image processing system. In a first example of the system, training the noise reduction neural network to reduce or optionally remove unstructured noise from the second training set of images and the third training set of images further includes both of training the noise reduction neural network to map images of the second training set of images to corresponding images of the third training set of images, and map images of the third training set of images to corresponding images of the second training set of images. In a second example of the system, optionally including the first example, retraining the noise reduction neural network on the second training set of images, the third training set of images, and the fourth training set of images to reduce or optionally remove structured noise from the second training set of images and the third training set of images further includes: in a first step of the second training stage: calculating a first weight adjustment of the noise reduction neural network, the first weight adjustment based on one of a difference between an output of the noise reduction neural network based on an input image of the second training set of images and a target image of the third training set of images and a difference between an output of the noise reduction neural network based on an input image of the third training set of images and a target image of the second training set of images, and in a second step of the second training stage: calculating a second weight adjustment of the noise reduction neural network, the second weight adjustment based on a difference between an output of the noise reduction neural network based on an input image of the second training set of images or the third training set of images and a target image of the fourth training set of images, summing the first weight adjustment and the second weight adjustment to generate a total weight adjustment, and adjusting a plurality of weights of the noise reduction neural network based on the total weight adjustment. In a third example of the system, optionally including one or both of the first and second examples, the first weight adjustment is calculated based on minimizing a first loss function, and the second weight adjustment is calculated based on minimizing a second loss function. In a fourth example of the system, optionally including one or more or each of the first through third examples, the first loss function is a Mean Absolute Error (MAE) loss function, and the second loss function is a Structural Similarity Index (SSIM) loss function.

The disclosure also provides support for a method for training a neural network, comprising: training the neural network using training image pairs interchangeably including an input image from a first noisy dataset of images and a corresponding target image from a second noisy dataset of images, and an input image from the second noisy dataset of images and a corresponding target image from the first noisy dataset of images, and for each input image inputted into the neural network, adjusting weights of the neural network during backpropagation based on minimizing a first loss function, the first loss function based on a difference between an output of the neural network and the target image corresponding to the input image. In a first example of the method, the neural network is a noise reduction neural network trained to reduce an amount of noise in an image, and wherein the first noisy dataset of images and the second noisy dataset of images are generated from an original set of images, the first noisy dataset of images having a first amount of noise and the second noisy dataset of images having a second, different amount of noise. In a second example of the method, optionally including the first example, the method further comprises: training the neural network using a second target image, and during backpropagation, adjusting weights of the neural network based on minimizing the first loss function and a second loss function, the second loss function based on a difference between an output of the neural network and the second target image. In a third example of the method, optionally including one or both of the first and second examples, adjusting the weights of the neural network based on minimizing the first loss function and a second loss function further comprises calculating a first weight adjustment based on the first loss function and a second weight adjustment based on the second loss function, and adjusting the weights based on a summation of the first weight adjustment and the second weight adjustment.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A multi-stage deep learning method, comprising:
generating, via a noise generator, a first noisy dataset with a first noise level by adding a first amount of noise to a low noise data;
generating, via the noise generator, a second noisy dataset with a second noise level by adding a second amount of noise to the low noise data, the second noise level having more noise than the first noise level;
training a deep learning network to reduce or remove unstructured noise using a first set of training pairs, wherein a first portion of the first set of training pairs includes input data from the first noisy dataset with the first noise level and target data from the second noisy dataset with the second noise level, and a second portion of the first set of training pairs includes input data from the second noisy dataset with the second noise level and target data from the first noisy dataset with the first noise level;
generating an ultra-low noise data equivalent based on the low noise data fed into the trained deep learning network, the low noise data having a noise level lower than the noise levels of the first noisy dataset and the second noisy dataset, the ultra-low noise data equivalent having a noise level lower than the low noise data;
retraining the deep learning network on a second set of training pairs generated in a same manner as the first set of training pairs using target data of the second set of training pairs in a first retraining step, and using the ultra-low noise data equivalent as target data in a second retraining step;
generating noise-reduced images based on new noisy images fed into the retrained deep learning network, the noise-reduced images having less structured and unstructured noise than the new noisy images; and
displaying the noise-reduced images via a display device of an image processing system.

2. The method of claim 1, wherein each image of the first noisy dataset corresponds to an image of the second noisy dataset.

3. The method of claim 2, wherein each image pair of the first set of training pairs includes one of:
a first input/target combination including an input image of the first noisy dataset and a corresponding target image of the second noisy dataset; and
a second input/target combination including an input image of the second noisy dataset and a corresponding target image of the first noisy dataset.

4. The method of claim 3, wherein the training pairs include a random selection of image pairs of the first input/target combination and image pairs of the second input/target combination.

5. The method of claim 3, wherein retraining the deep learning network with the training pairs and with the ultra-low noise data equivalent as target data further comprises:
for each image pair of the second set of training pairs:
during the first retraining step, calculating a result of a first loss function using the input data and the target data of the image pair;
during the second retraining step, calculating a result of a second loss function using the input data of the image pair and the ultra-low noise data equivalent as the target data; and
adjusting a plurality of weights of the deep learning network based on a combination of the result of the first loss function and the result of the second loss function.

6. The method of claim 5, wherein the combination of the result of the first loss function and the result of the second loss function is a weighted summation of the result of the first loss function and the result of the second loss function.

7. The method of claim 5, wherein the first loss function is different from the second loss function.

8. The method of claim 5, wherein the first loss function and the second loss function include one of a perceptual loss function, an adversarial loss function, and a feature similarity index.

9. The method of claim 1, further comprising generating the first noisy dataset by performing a scan of an imaging phantom at a first dose, and generating the second noisy dataset by performing a scan of the imaging phantom at a second dose.

10. The method of claim 1, wherein the first noisy dataset, the second noisy dataset, and the low noise data include one of computerized tomography (CT) imaging data, multi-energy CT, spectral CT, magnetic resonance imaging (MRI) data, x-ray data, positron emission tomography (PET) data, ultrasound image data, sinogram data, and k-space data.

11. The method of claim 10, wherein the low noise data is CT image data generated from reconstruction frequency kernels, and the CT image data of the low noise data, the first noisy dataset, and the second noisy dataset are grouped by reconstruction frequency kernel during training.

12. An image processing system comprising:
a noise reduction neural network;
a noise generator;
a first training set of images having a first noise profile;
a second training set of images with a second noise profile, the second noise profile having more noise than the first noise profile;
a third training set of images with a third noise profile, the third noise profile having more noise than the second noise profile;
a processor communicably coupled to a non-transitory memory storing the noise reduction neural network and including instructions that when executed cause the processor to:
use the noise generator to generate the second training set of images with the second noise profile by adding a first amount of noise to the first training set of images;
use the noise generator to generate the third training set of images with the third noise profile by adding a second amount of noise to the first training set of images;

pair images of the second training set of images with corresponding images of the third training set of images to create image pairs;
in a first training stage, train the noise reduction neural network to reduce or remove unstructured noise from the second training set of images and the third training set of images using the image pairs;
deploy the trained noise reduction neural network to output a fourth training set of images with a fourth noise profile using the first training set of images as input to the trained noise reduction neural network, the fourth noise profile including a lesser amount of noise than the first noise profile;
in a second training stage, retrain the noise reduction neural network on the second training set of images, the third training set of images, and the fourth training set of images to reduce or remove structured noise from the second training set of images and the third training set of images, including entering the image pairs as corresponding inputs and targets, and using the fourth training set of images as additional target images;
deploy the retrained noise reduction neural network to generate noise-reduced images from new noisy images, the noise-reduced images having less structured and unstructured noise than the new noisy images; and
display the noise-reduced images via a display device of the image processing system.

13. The system of claim 12, wherein training the noise reduction neural network to reduce or remove unstructured noise from the second training set of images and the third training set of images using the image pairs further includes both of training the noise reduction neural network to map images of the second training set of images to corresponding images of the third training set of images, and map images of the third training set of images to corresponding images of the second training set of images, further comprising additional instructions that when executed cause the processor to:
prior to training the noise reduction neural network in the first training stage, assign each of the image pairs as either a first-stage training image pair or a first-stage test image pair in a pre-established proportion, wherein the first-stage training image pairs are used to train the noise reduction neural network in the first training stage and the first-stage test image pairs are used to validate a performance of the noise reduction neural network in the first training stage;
reorder the image pairs based on a new random ordering; and
prior to retraining the noise reduction neural network in the second training stage and after reordering the image pairs, reassign each of the image pairs as either a second-stage training image pair or a second-stage test image pair in a pre-established proportion, wherein the second-stage training image pairs are used to retrain the noise reduction neural network in the second training stage and the second-stage test image pairs are used to validate a performance of the noise reduction neural network in the second training stage.

14. The system of claim 12, wherein retraining the noise reduction neural network on the second training set of images, the third training set of images, and the fourth training set of images to reduce or remove structured noise from the second training set of images and the third training set of images further includes:
in a first step of the second training stage:
calculating a first weight adjustment of the noise reduction neural network, the first weight adjustment based on one of a first difference between a first output of the noise reduction neural network based on a first input image of the second training set of images and a first target image of the third training set of images and a second difference between a second output of the noise reduction neural network based on a second input image of the third training set of images and a second target image of the second training set of images; and
in a second step of the second training stage:
calculating a second weight adjustment of the noise reduction neural network, the second weight adjustment based on a third difference between a third output of the noise reduction neural network based on an input image of the second training set of images or the third training set of images and a target image of the fourth training set of images, the fourth training set of images comprising the target image;
summing the first weight adjustment and the second weight adjustment to generate a total weight adjustment; and
adjusting a plurality of weights of the noise reduction neural network based on the total weight adjustment.

15. The system of claim 14, wherein the first weight adjustment is calculated based on minimizing a first loss function, and the second weight adjustment is calculated based on minimizing a second loss function, further comprising additional instructions that when executed cause the processor to pause training the noise reduction neural network in the first training stage and retraining the noise reduction neural network in the second training stage at regular intervals, and, when paused, test a performance of the noise reduction neural network using test image pairs of the image pairs, and wherein training the noise reduction neural network in the first training stage or retraining the noise reduction neural network in the second training stage ends when an error rate of the performance of the noise reduction neural network using the test image pairs is within a threshold of a minimum value.

16. The system of claim 15, wherein the first loss function is a Mean Absolute Error (MAE) loss function, and the second loss function is a Structural Similarity Index (SSIM) loss function, and wherein the first training set is CT image data generated from reconstruction frequency kernels, and the CT image data of the first training set, the second training set, and the third training set are grouped by reconstruction frequency kernel during training.

17. A method for training a neural network, comprising:
generating, by a noise generator, a first noisy dataset of images by adding a first amount of noise to a reference dataset of images having a first noise profile;
generating, by the noise generator, a second noisy dataset of images by adding a second amount of noise, greater than the first amount of noise, to the dataset of images;
in a first training stage, training the neural network to reduce or remove unstructured noise from the first noisy dataset of images and the second noisy dataset of images using training image pairs interchangeably including an input image from the first noisy dataset of images and a corresponding target image from the second noisy dataset of images, and an input image from the second noisy dataset of images and a corresponding target image from the first noisy dataset of images;

deploying the trained neural network to output a third dataset of images with a third noise profile using the reference dataset of images as input, the third noise profile having a lesser amount of noise less than the first noise profile;

in a second training stage, retraining the neural network on the first noisy dataset of images, the second noisy dataset of images, and the third dataset of images to reduce or remove structured noise from the first noisy dataset of images and the second noisy dataset of images;

deploying the retrained neural network to generate noise-reduced images from provided images having less structured and unstructured noise than the provided images;

displaying the noise-reduced images on a display device; and for each input image inputted into the neural network, adjusting weights of the neural network during backpropagation based on minimizing a first loss function, the first loss function based on a difference between an output of the neural network and the target image corresponding to the input image.

18. The method of claim 17, wherein the neural network is a noise reduction neural network trained to reduce an amount of noise in an image.

19. The method of claim 18, further comprising training the neural network using a second target image, and during backpropagation, adjusting weights of the neural network based on minimizing the first loss function and a second loss function, the second loss function based on a difference between an output of the neural network and the second target image.

20. The method of claim 19, wherein adjusting the weights of the neural network based on minimizing the first loss function and the second loss function further comprises calculating a first weight adjustment based on the first loss function and a second weight adjustment based on the second loss function, and adjusting the weights based on a summation of the first weight adjustment and the second weight adjustment.

* * * * *